United States Patent [19]

Arnaud et al.

[11] 3,917,851

[45] Nov. 4, 1975

[54] FERMENTED SOYA PROTEIN

[75] Inventors: Michel Arnaud; David Robert Farr, both of La Tour-de-Peilz, Switzerland

[73] Assignee: Societe d'Assistance Technique Pour Produits Nestle S.A., Lausanne, Switzerland

[22] Filed: May 24, 1974

[21] Appl. No.: 473,206

[30] Foreign Application Priority Data
May 28, 1973 Switzerland............................ 7635/73

[52] U.S. Cl. .................. 426/46; 426/542; 426/637; 426/656
[51] Int. Cl.² ...................... A23J 1/14; A23L 1/204
[58] Field of Search ............. 426/46, 179, 205, 212, 426/228

[56] References Cited
UNITED STATES PATENTS
3,803,327   4/1974   Fujimaki et al.................. 426/46 X Primary Examiner—James R. Hoffman
Attorney, Agent, or Firm—Watson Leavenworth Kelton & Taggert

[57] ABSTRACT

A process for preparing a fermented soya protein material, in which a substrate comprising a substantial proportion of soya proteins and having a fat content not exceeding 2% by weight is fermented in an aqueous medium with a mould of the genus Rhizopus, and a fermented material is recovered from the medium.

6 Claims, No Drawings

FERMENTED SOYA PROTEIN

The present invention is concerned with the preparation of an edible substance derived from soya.

Tempeh (Tempa), a traditional food of Indonesia, has aroused the interest of specialists in the food industry by virtue of its savoury qualities, digestibility and keeping qualities which distinguish it from the raw soya bean from which it is obtained by fermentation with a mould. A move has been made to study these qualities and the possibility of their use on an industrial scale. Thus, for example, the anti-oxidant power of Tempeh has been examined, inter alia by comparison with a known anti-oxidant such as α-tocopherol. Certain antioxidant principles have been extracted, in particular 6,7,4'-trihydroxyflavone, using organic solvents such as ethanol and ether. Various mould strains have been tried for inoculating the soya beans, the best results having been obtained with the moulds of the genus Rhizopus, especially *Rhizopus oligosporus* and *Rhizopus oryzae*. A number of methods for preparing Tempeh have been proposed, such as fermentation of a slurry prepared starting from whole soya beans, followed by drying in order to obtain Tempeh powder. Various types of Tempeh have become known, in particular a fermented mixture of split soya beans and milled cereal grains such as wheat and rice. Finally, foodstuffs have been proposed comprising Tempeh as a stabiliser, as a source of proteins and as a flavouring agent, such as a fermented mixture of fatty pieces of fish or meat and Tempeh.

The present invention provides a process for preparing an edible substance derived from soya, in which a material rich in soya proteins is fermented with a mould of the genus Rhizopus, the material having a fat content not exceeding about 2%, and at least one fraction of the fermented material is recovered.

It has been found that it is possible to grow a mould of the genus Rhizopus on a non-fatty material rich in soya proteins and that the mould readily produces a substantial quantity of anti-oxidant substances. The overall anti-oxidant properties of the material obtained by this process are enhanced by the absence of easily oxidised fatty materials. Moreover, the proteins are partially degraded into peptides during the fermentation, which enhances the digestibility of the product which also has useful flavour qualities.

The species *Rhizopus oligosporus* or *Rhizopus oryzae* are preferably used for the fermentation, and the non-fatty starting material of high soya protein content is advantageously a defatted bean flour. The fermentation is conveniently carried out in aqueous suspension, with agitation, and the fermented suspension may be dried to provide a fermented defatted soya flour of excellent flavour.

The suspension preferably contains not more than 15% by weight of flour, as higher concentrations cause an increase in viscosity which is less desirable if preliminary treatments such as sterilisation are to be applied. Fermentation may conveniently be carried out at a temperature of 20° to 40°C. It has been observed that the anti-oxidant properties of the fermented flour increase with time up to a certain limit, and then decrease. Good results may be obtained with a duration of fermentation of between 20 and 45 hours. The pH of the suspension may be adjusted to a value between 4 and 8. At the end of the fermentation it is advantageous to pasteurise the suspension.

Complete drying of the fermented suspension is not necessarily carried out. It is possible, as an alternative, to carry out a separation of the fermented suspension into a soluble fraction and an insoluble fraction, for example by centrifuging. The two fractions may be dried and recovered separately, and each represents approximately 50% of the initial solids. It has been found that the bulk of the anti-oxidising substances are contained in the soluble fraction, but the insoluble fraction is not devoid of these. The two fractions, moreover, possess a distinct taste, smell and colour.

Instead of soy flour, the starting material in the fermentation process may be a textured material produced from defatted soya flour by extrusion cooking. It has thus been found that Rhizopus grows well on textured protein fragments and that the fermentation leads to the formation of anti-oxidant principles which is not accompanied by the appearance of a bitter flavour, but rather of a pleasant cheese-like note. Such fermented textured proteins may be incorporated in the production of the textured proteins themselves in order to impart a desired flavour and as a stabilising agent to inhibit rancidity which may develop in any fatty residues present. The fermented textured material may be dried and then reduced to powder, so that it may be incorporated in the defatted soya flour used as starting material in the extrusion cooking process. It is noteworthy that the desirable properties of the product are retained in the texturing operation, even when a textured product is subjected to a further extrusion cooking operation after admixture with soya flour.

As previously mentioned, the fermented material has a variety of uses. For example, it may be admixed with defatted soya flour preferably in amounts of about 5 to 10% by weight of the mixture, in the production of textured proteins. Both the soluble and the insoluble fraction of the fermented defatted soya flour may be used.

Another particular form of utilisation of the fermented edible substance produced in accordance with the invention comprises its incorporation in dehydrated vegetable flakes or slices. The concentration of the fermented material may represent about 5 to 10% by weight. The foodstuff obtained in this way is characterised by improved resistance to changes in colour and to deterioration of its flavour caused by oxidation on storage. Moreover, the vegetable slices or flakes have interesting organoleptic qualities: for example, a hazelnut note may be imparted to potato flakes. Considering, on the other hand, that the principal constituents of vegetable flakes or slices, namely starch and other carbohydrates, are not of prime nutritional interest, addition of the fermented material, containing proteins that have been degraded to easily digestible peptides, improves the nutritive qualities of the vegetables. Such vegetable products are thus suitable for incorporation in dietetic foods for children or in geriatric diets.

In yet another application, the soluble fraction of the fermented defatted soya flour is incorporated in beverages, which have enhanced nutritive qualities.

Finally, it is also possible to extract anti-oxidant substances from the fermented soya protein material. The extraction may be performed either on the total material or only on the soluble fraction, conveniently with an organic solvent or solvent mixture. Preferred solvents include 95% ethanol and water-ethanol-trichloroethylene mixtures. Especially suitable is an approximately 70:135:795 by volume mixture of water-ethanol-trichloroethylene. Extraction may be effected, for example, during about 2 hours under reflux, the solvent being maintained at its boiling temperature, or in a soxhlet apparatus, for about 9 hours.

The invention is illustrated by the following Examples, in which the percentages are by weight.

EXAMPLE 1

An aqueous suspension containing 8% of defatted soya flour solids is prepared, and the pH is adjusted to 4.7. 500 ml aliquots of this suspension are placed in 2-litre conical flasks and then sterilised at 120°C for 15 minutes. After cooling the sterilised suspension is inoculated with a suspension of *Rhizopus oligosporus* spores. These spores were produced in petri dishes in a nutrient medium containing 4% glucose, 1% yeast extract, 0.3% $KH_2PO_4$ and 2% agar as solidifying agent. The inoculated flasks are agitated at 25°C on rotary shakers for 40 hours, and the flasks are then centrifuged for 20 minutes at 15,000 G. The supernatant and the precipitate are recovered and lyophilised separately.

EXAMPLE 2

A defatted soy flour suspension, prepared and sterilised as in Example 1, is inoculated at the rate of 100 ml per flask with a suspension of *Rhizopus oligosporus* mycelium grown in a nutrient medium containing 4% glusoce, 1% yeast extract and 0.3% $KH_2PO_4$. The inoculated flasks are agitated at 25°C in rotary shakers during 40 hours. The suspension is then filtered and the filtrate and residue recovered separately and lyophilised.

EXAMPLE 3

180 litres of an aqueous suspension of defatted soya flour containing 7.5% solids are sterilised for 45 minutes at 120°C in a 300-liter fermenter. The pH of the suspension is adjusted to 4.8 and an inoculum of *Rhizopus oligosporus* added. Fermentation is carried out for 40 hours, with aeration at the rate of 130 liters of air per minute and agitation by a turbine stirrer operating at 250 rpm. 1 kg of soya oil is added as anti-foam.

EXAMPLE 4

1.0 kg of textured material obtained by extrusion cooking of defatted soya flour are rehydrated with distilled water. The rehydrated material is boiled for 2 minutes, cooled and drained. This material is then inoculated with 200 ml of a dense aqueous suspension of *Rhizopus oligosporus* spores. The inoculated material is placed in perforated metallic containers measuring 4 cm × 30 cm and is incubated at 25°C for 24 hours. It is then dried at 55°C and ground.

EXAMPLE 5

Fermented and dried defatted soya flour (submerged fermentation using *Rhizopus oligosporus*, a suspension with an 8% solids content, fermentation temperature = 25°C, pH = 4.7, duration = 35 hours, drying of the fermented suspension by lyophilisation) is blended at a level of 5% with a defatted soy flour. The blend is submitted to a standard extrusion cooking procedure and an extruded product having a meatlike texture is obtained. This product is designated product B, a second product, designated A, is prepared by the same procedure but starting from defatted soya flour to which no fermented material has been added. Products A and B are dried under identical conditions in a forced air drier. Both products have the same appearance and texture but product B differs from product A in having a characteristic odour and flavour. 50 g portions of the two products are packed in sealed cans and stored at 30°C. The results of control examinations (peroxide value and organoleptic) carried out at regular intervals during a period of several months show that product B is superior and, in particular, its characteristic odour and flavour are retained.

EXAMPLE 6

Defatted soya flour containing 5% of lyophilised supernatant material obtained by centrifugation of a fermented defatted soya flour (submerged fermentation using *Rhizopus oligosporus*, a suspension with an 8% solids content, fermentation temperature = 25°C, pH = 4.7, duration = 35 hours, centrifuging of the fermented flour for 20 minutes at 15.000 G) is submitted to an extrusion cooking process and, as described in Example 5, extruded products A and B are obtained. A storage test lasting several months shows that product B is more stable, with respect to odour and flavour, than product A.

EXAMPLE 7

Products A and B are prepared as described in Example 5, except that the fermented material prepared as described in Example 4 is used, at a 5% level, in the preparation of product B. Again the flavour properties of product B are found to be more stable on storage than those of product A.

EXAMPLE 8

12 kg potatoes are washed, trimmed and peeled mechanically. They are cut into slices approximately 10 mm thick, precooked at 70°C for 15 minutes and then cooled by washing in running water. The slices are then cooked at 100°C for 20 minutes and mashed in a press to form a puree. 10 kg of this puree, containing about 20% solids, are divided into two lots, A and B, each of 5 kg. 6 kg of water are added to lot A, with gentle stirring, to yield a pumpable mass having a solids content of approximately 9%. Lot B is mixed with 6 kg of water containing approximately 50 g of fermented defatted soya flour (submerged fermentation, using *Rhizopus oligosporus*, solids content of the flour suspension = 8%, pH = 4.7, duration of the fermentation = 36 hours, fermentation temperature = 25°C, freeze-dried). A pumpable suspension is thus obtained, containing about 9.5% solids with the fermented flour representing 5% of the total solids. After drying on a roller drier, 50 g portions of lots A and B are packed in cans under an atmosphere of air and the cans are stored at 30°C. At regular intervals over several months changes in the carotenoid pigments and the organoleptic properties of the products are examined. The results are clearly in favour of samples B. Product B has a novel and agreeable flavour and an odour reminiscent of hazelnut which remains unaltered during the course of the storage test.

EXAMPLE 9

In a potato flake production line yielding 75 kg/hour of product (equivalent to about 70 kg/hour of solids) a suspension of soya flour fermented by *Rhizopus oligosporus* (40-hour fermentation, temperature = 25°C, pH = 4.6–4.8, solids content of the suspension during the fermentation = 7.5%, freeze-dried) is added before roller drying. This suspension, which contains 7 kg flour in 42 liters water, is added to the puree at the rate of 420 ml/minute. The final product, obtained in the form of flakes has the same colour and texture as a product without soya flour. It contains 5.7% by weight of fermented flour and has an agreeable flavour.

EXAMPLE 10

1.5 kg of freeze-dried fermented defatted soya flour (fermentation conditions identical to those listed in the preceding example) are added to 28.5 kg dehydrated potato flakes in a mixer. The resulting product, on reconstitution, has the same organoleptic qualities as those of the products described in Examples 8 and 9.

EXAMPLE 11

Freeze-dried fermented defatted soya flour (fermentation conditions using *Rhizopus oligosporus* similar to the conditions listed in Example 9) is extracted in a Soxhlet extractor for 8 hours with a 70:135:795 by volume mixture of water-ethanol-trichloroethylene. After concentration, a residue is obtained, corresponding to approximately 2.5% of the initial material. The anti-oxidant efficiency of this extract is tested by the "Swift test" procedure. This is an accelerated oxidation test, called also the "Active Oxygen Method", in which air is bubbled under standard conditions through a quantity of chicken fat to which the anti-oxidant is added. The amount of peroxide formed is determined colorimetrically at regular time intervals, and the results are expressed in milliequivalents of oxygen per kg of solid material. A control without added anti-oxidant is run simultaneously under identical conditions. The quantity of extract added represents 0.1% of the weight of the solids of the fat substrate. The results listed in the table below show clearly that this extract has an effective anti-oxidant activity.

| Duration of Swift test in hours | Peroxide value in meg $O_2$/kg | |
|---|---|---|
| | Control | Extract |
| 10 | 7.47 | 2.1 |
| 11 | 9.19 | 1.9 |
| 12 | 11.0 | 2.3 |
| 13.5 | 17.7 | 3.4 |
| 15 | 51.8 | 4.4 |
| 16.5 | 203.0 | 6.7 |
| 18.5 | 359.2 | 8.7 |

EXAMPLE 12

An extract obtained as described in Example 11 is incorporated in mashed potatoes prior to drying to provide potato flakes. The resulting flakes have similar organoleptic properties to a control without added extract, and also have an extended shelf life.

We claim:

1. A process for preparing a fermented soya protein material, in which a substrate comprising a substantial proportion of soya proteins and having a fat content not exceeding 2% by weight is fermented in an aqueous medium with a mould of the genus Rhizopus, and a fermented material is recovered from the medium.

2. A process according to claim 1 in which the mould is Rhizopus oligosporus or Rhizopus oryzae.

3. A process according to claim 1, in which the soya material comprises defatted soya flour or a textured soya protein.

4. A process according to claim 1, in which the fermentation is effected at a pH of 4 to 8.

5. A process according to claim 1, in which fermentation is effected at a temperature of 20° to 40°C.

6. A composition comprising a foodstuff and a fermented soya protein material obtained by the process of claim 1.

* * * * *